US009934812B2

(12) United States Patent
Fasen et al.

(10) Patent No.: US 9,934,812 B2
(45) Date of Patent: Apr. 3, 2018

(54) TENSION FEEDBACK FOR TAPE TENSION (71) Applicant: Hewlett Packard Enterprise Development LP, Houston, TX (US)

(72) Inventors: Donald J. Fasen, Boise, ID (US); Vernon L. Knowles, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 128 days.

(21) Appl. No.: 14/896,350

(22) PCT Filed: Jun. 24, 2013

(86) PCT No.: PCT/US2013/047285
§ 371 (c)(1),
(2) Date: Dec. 4, 2015

(87) PCT Pub. No.: WO2014/209257
PCT Pub. Date: Dec. 31, 2014

(65) Prior Publication Data
US 2016/0125909 A1 May 5, 2016

(51) Int. Cl.
G11B 15/43 (2006.01)
G11B 15/54 (2006.01)
G11B 15/46 (2006.01)
G11B 15/093 (2006.01)

(52) U.S. Cl.
CPC ............ G11B 15/43 (2013.01); G11B 15/093 (2013.01); G11B 15/46 (2013.01); G11B 15/54 (2013.01)

(58) Field of Classification Search
CPC ... G11B 5/008; G11B 5/00813–5/0083; G11B 5/02; G11B 15/093; G11B 15/43; G11B 15/46; G11B 15/54

USPC ........................ 360/55, 69, 71, 73.04–73.14; 242/334–334.6
See application file for complete search history.

(56) References Cited

U.S. PATENT DOCUMENTS

| 4,125,881 A | 11/1978 | Eige et al. |
| 5,327,304 A | 7/1994 | Owada et al. |
| 5,550,685 A | 8/1996 | Drouin |
| 5,808,824 A | 9/1998 | Kaniwa et al. |
| 5,860,610 A | 1/1999 | Nishida et al. |

(Continued)

FOREIGN PATENT DOCUMENTS

| CN | 1996473 A | 7/2007 |
| CN | 101149943 A | 3/2008 |

(Continued)

OTHER PUBLICATIONS

Extended European Search Report received in EP Application No. 13887755.0, dated Dec. 5, 2016, 8 pages.

(Continued)

*Primary Examiner* — Joseph Feild
*Assistant Examiner* — James L Habermehl
(74) *Attorney, Agent, or Firm* — Hewlett Packard Enterprise Patent Department (57) ABSTRACT

A tension feedback signal is generated to reduce tension variation on a tape occurring at a reel frequency. Tension variation information may be obtained and used to generate the tension feedback signal. The tension feedback signal may be combined with a constant tension preset signal. The combined signal may be used to drive a tape reel at a tape reel speed adjusted according to the combined signal.

17 Claims, 5 Drawing Sheets

(56) References Cited

U.S. PATENT DOCUMENTS

| | | | |
|---|---|---|---|
| 6,243,225 | B1 | 6/2001 | Wyman et al. |
| 6,305,629 | B1 | 10/2001 | Chliwnyj et al. |
| 6,563,659 | B1 | 5/2003 | Fasen |
| 6,762,900 | B2 | 7/2004 | Bui |
| 6,817,560 | B2 * | 11/2004 | Karp ............... G11B 15/43 242/334.3 |
| 6,831,801 | B2 * | 12/2004 | Chliwnyj ............ G11B 15/43 360/71 |
| 6,943,979 | B2 | 9/2005 | Goker |
| 7,016,138 | B2 * | 3/2006 | Egan ............... G11B 15/43 360/71 |
| 7,480,117 | B2 | 1/2009 | Biskeborn et al. |
| 7,495,859 | B2 | 2/2009 | Weber |
| 7,652,841 | B2 | 1/2010 | Kawakami |
| 7,876,521 | B2 | 1/2011 | Cherubini et al. |
| 7,957,088 | B1 | 6/2011 | Bui et al. |
| 8,094,402 | B2 | 1/2012 | Bui et al. |
| 8,094,405 | B1 | 1/2012 | Ying et al. |
| 8,840,056 | B2 * | 9/2014 | Cherubini ........... G11B 15/32 242/334.3 |
| 8,982,500 | B1 * | 3/2015 | Cherubini .......... G11B 15/43 360/71 |
| 2003/0156344 | A1 | 8/2003 | Chliwnyj et al. |
| 2005/0057843 | A1 | 3/2005 | Egan |
| 2005/0167460 | A1 | 8/2005 | Franz et al. |
| 2007/0131811 | A1 | 6/2007 | Biskeborn et al. |
| 2009/0040643 | A1 | 2/2009 | Weng |
| 2009/0296269 | A1 | 12/2009 | Fujita |
| 2012/0281309 | A1 | 11/2012 | Fasen et al. |

FOREIGN PATENT DOCUMENTS

| | | |
|---|---|---|
| CN | 101663173 A | 3/2010 |
| EP | 0524819 A2 | 1/1993 |
| EP | 0582285 A2 | 2/1994 |
| GB | 2449053 | 11/2008 |
| JP | 06150456 A | 5/1994 |
| JP | 07296456 A | 11/1995 |

OTHER PUBLICATIONS

ISR/WO, PCT/US2013/047285, HP reference 83270972, Mar. 20, 2014, 10 pps.

Takao, T. et al., Reduction of Mechanical Losses Due to Frictional Heat in Bi-2223 Tapes Using Structural Materials of Various Thermal Expansion Properties, (Research Paper), Applied Superconductivity, IEEE Transactions on, Jun. 2010, pp. 2115-2118, vol. 20, No. 3. http://ieeexplore.ieee.org/stamp/stamp.jsp?tp=&arnumber=5424097.

* cited by examiner

TENSION FEEDBACK FOR TAPE TENSION

BACKGROUND

In tape storage, data may be stored on a plurality of longitudinal data tracks of a storage tape. During operation, the storage tape is moved longitudinally with respect to a tape head. In some cartridge-based tape systems, tape moves between a cartridge reel in a tape cartridge and a drive reel in a tape drive. The tape drive may have a cartridge motor to drive the tape cartridge reel and a drive motor to drive the drive reel.

BRIEF DESCRIPTION OF THE DRAWINGS

Certain examples are described in the following detailed description and in reference to the drawings, in which.

DETAILED DESCRIPTION

Track misregistration occurs when a read element on a tape drive head is misaligned with respect to a tape track previously written. Track misregistration may be affected by tape dimensional stability (TDS), i.e., lateral and longitudinal dimensional stability. TDS is affected by environmental factors such as humidity, temperature, and internal factors such as tape tension.

Due to the Poisson effect, the tape contracts laterally when tension increases and expands laterally when tension decreases. These contractions and expansions move data tracks laterally, causing track misregistration. This form of track misregistration may be particularly pronounced with respect to the outermost read elements.

Time varying, or "AC," tension may be caused by eccentricities in the tape pack or variations in the reel radius. This AC tension may have large frequency-domain components at the tape drive reel and tape cartridge reel frequencies. Tape cartridge reels, typically manufactured with higher tolerances than tape drives, may have a greater impact on AC tension than tape drive reels.

This disclosure provides techniques that may help reduce a reel frequency component of the AC tape tension. Reducing a reel frequency component of the AC tension may increase TDS and reduce track misregistration. This may enable the increase of areal storage density in magnetic tape storage systems.

Figure 1:
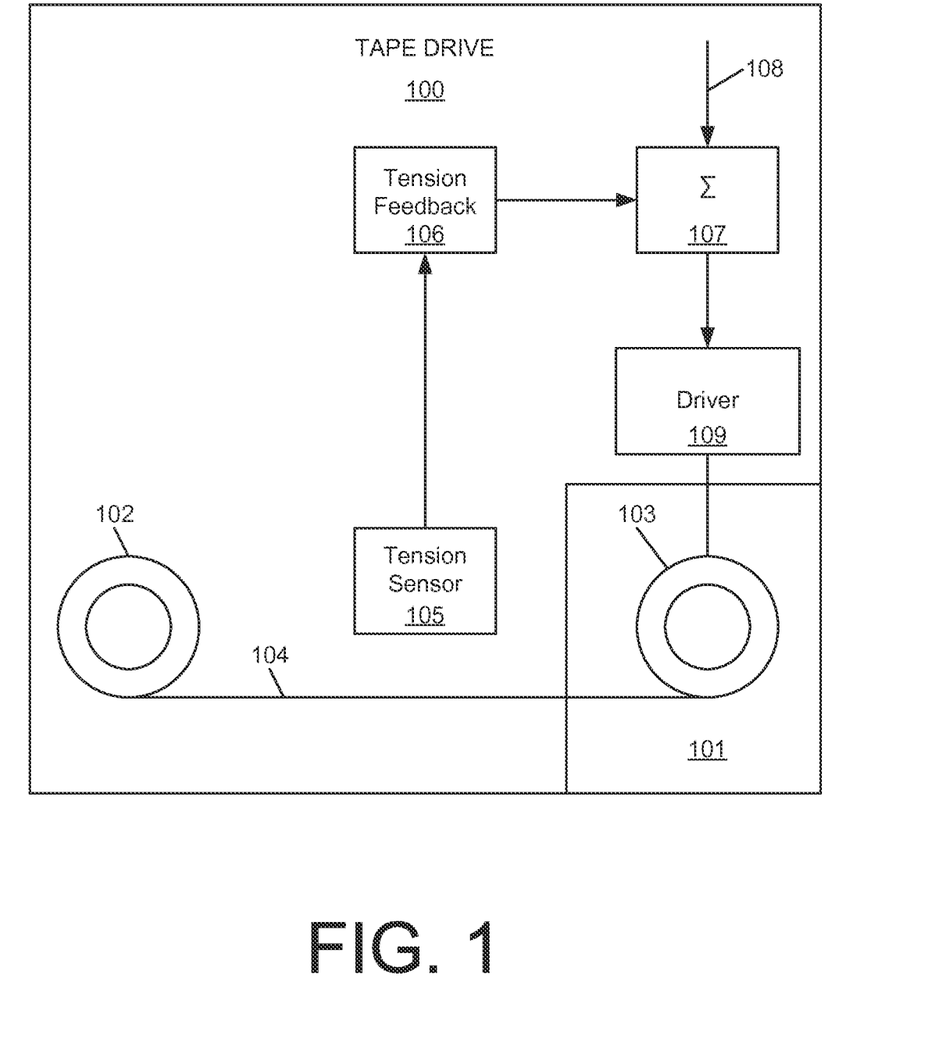
FIG. 1 illustrates an example tape drive having a tension feedback module.

FIG. 1 illustrates an example tape drive 100 having a tension feedback module 106 for reducing a reel frequency component of AC tape tension. The tape drive 100 receives a tape cartridge 101 having a cartridge reel 103. During operation, tape 104 is transported between the cartridge reel 103 and a tape drive reel 102.

The example tape drive 100 includes a tension sensor 105. The tension sensor 105 obtains tape tension variation information. For example, the tension sensor 105 may obtain tape tension variation information from servo-bands on the tape. The tape tension variation information may be obtained by comparing a first servo signal from a first servo-band with a second servo signal from a second servo-band. The difference between the first and second servo signals may be used to calculate a change in the lateral tape dimension, i.e., the width. Repeatedly sampling this measurement generates the tension variation information as a tape expansion signal.

The tape expansion signal is proportional to the tension, with a constant of proportionality, $K_{TENSION}$, representing the ratio of tension to width change. The constant may be determined for the particular formulation of the tape 104 and the parameters of the tape drive 100. For example, the constant may be based on the relationship that tension divided by change in width equals tape thickness times the tape's Young's modulus divided by the tape's Poisson's ratio.

As further examples, the tension sensor 105 may comprise a mechanical or optical sensor that measures tape tension or tape expansion directly or indirectly.

The tape drive 100 includes a tension feedback module 106. The tension feedback module 106 receives the tension variation information from the tension sensor 105. The tension feedback module 106 uses the tension variation information to generate a tension feedback signal to reduce tension variation occurring at a reel frequency. For example, the tension feedback signal may be used to reduce the drive reel frequency component or the cartridge reel frequency component of the AC tension.

The tape drive 100 also includes a combiner 107. The combiner 107 combines, for example, by summing, the tension feedback signal and a constant tension preset signal 108. The constant tension preset signal 108 may be provided to maintain a constant, or "DC," tension on the tape 104. In some implementations, the constant tension preset signal 108 is a time-varying signal. For example, the tension on the tape 104 may be controlled by modulating the rotational speed of the reels 102, 103. The speed needed to maintain a constant tension may vary during operation. For example, the radius of the tape wound around reels 102, 103 (the "tape packs") may change during operation. Accordingly, the rotational speed required to maintain a linear operational speed of tape 104 may change as the tape pack radius changes. A time-varying constant tension preset signal 108 may accommodate the changing rotational speed.

Figure 2:
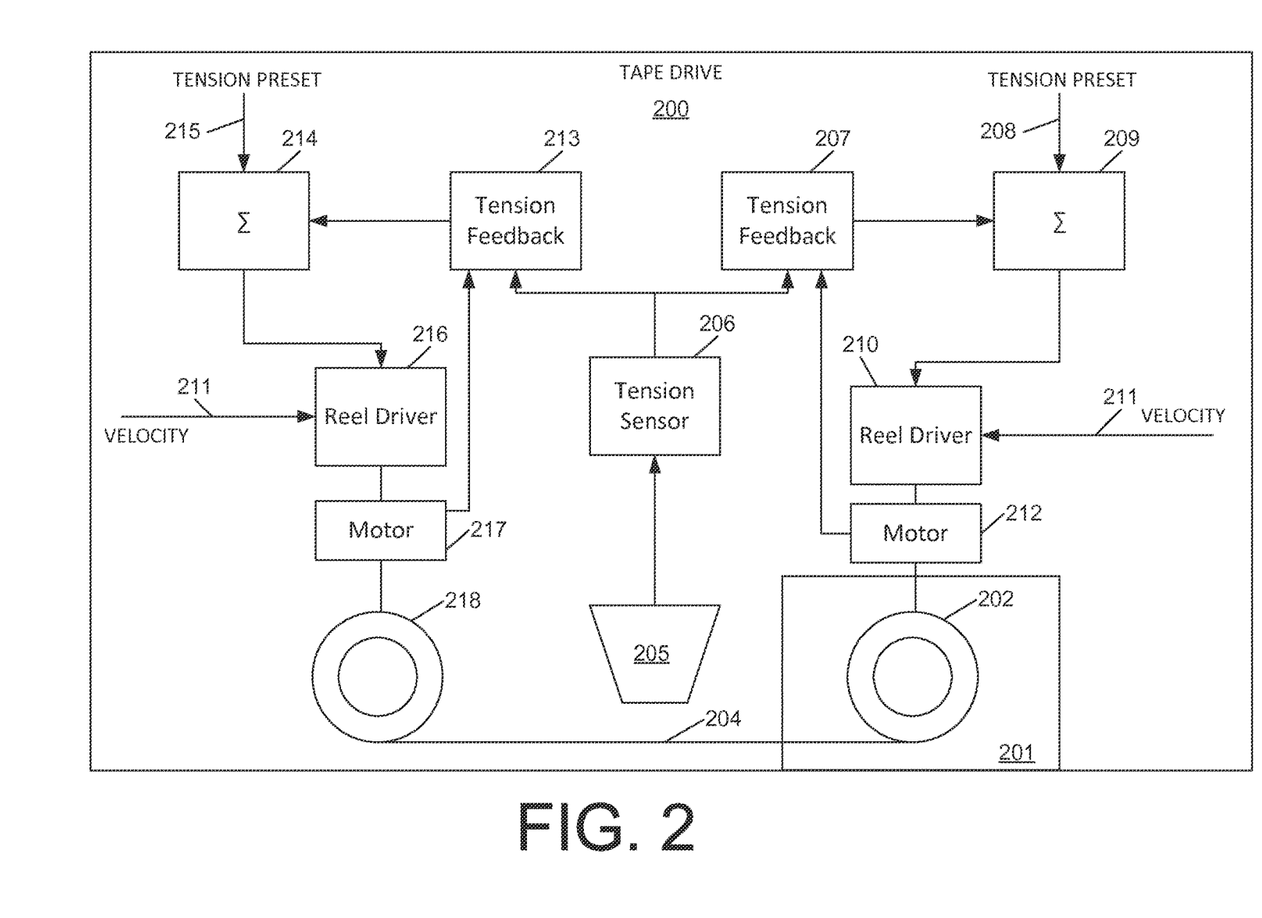
FIG. 2 illustrates an example tape drive having a first tension feedback module for a first tape reel and a second tension feedback module for a second tape reel.

The tape drive 100 further includes a driver 109. The driver 109 receives the combined signal from the combiner 107 and controls a reel motor to control the rotational speed of reel 103 ("reel speed"). In the illustrated implementation, the driver 109 drives the cartridge reel 103. In other implementations, the drive reel's 102 driver may receive the combined signal. The driver 109 adjusts the reel speed according to the combined signal. This controls the tension applied to the tape 104 to reduce the reel frequency component of the AC tension. The driver 109 may FIG. 2 illustrates an example tape drive 200 having tension feedback modules 206, 207 for both tape reels 202, 218. In this example, each feedback module 206, 207 generates a tension feedback signal to reduce a respective reel-frequency AC tension component.

The tape drive 200 receives a tape cartridge 201 having a tape cartridge reel 202. During operation, tape 204 is transported between the cartridge reel 202 and a tape drive reel 218 to move the tape 204 across a tape head 205. The tape head 205 has a plurality of read/write elements and servo elements. The servo elements read servo bands from the tape 204 to generate servo signals. The head 205 outputs the servo signals to a tension sensor 206.

In this example, the tension sensor 206 uses the servo signals to generate a tape expansion signal as tension variation information. The tension sensor 206 outputs the tape expansion signal to a first tension feedback module 207 and a second tension feedback module 213.

In this example, the tension feedback module 207 receives the tape expansion signal from tension sensor 206 and receives a reel speed signal from a cartridge reel motor 212. For example, the reel speed signal may be obtained from a sensor coupled to the motor 212 to read the speed at which the motor 212 is turning the cartridge reel 202, e.g., in rad/s. The tension feedback module 207 uses the reel speed signal and the tape expansion signal to generate a tension feedback signal to reduce tape tension variation occurring at the cartridge reel's 202 frequency. The frequency of the tension feedback signal may track the cartridge reel speed. The tension feedback module 207 outputs the tension feedback signal to a combiner 209.

The combiner 209 combines the tension feedback signal with a constant tension preset signal 208 to generate a combined signal. Similar to the signal 108 of FIG. 1, the constant tension preset signal 208 may be a signal provided to maintain a preset DC tension on the tape 204. The combiner 209 may sum the tension feedback signal and the constant tension preset signal 208 to generate the combined signal. The combiner 209 outputs the combined signal to a cartridge reel driver 210.

The cartridge reel driver 210 generates a control signal for the cartridge motor 212 using the combined signal and a velocity signal 211. The velocity signal 211 is a tape speed control signal configured according to operational parameters of the tape drive 200, such as read or write speed. In this example, the cartridge reel driver 210 modulates the velocity signal 211 with the combined tension signal. For example, the cartridge reel driver 210 may subtract the combined tension signal from the velocity signal 211. As another example, the cartridge reel driver 210 may add the combined tension signal to the velocity signal 211. The cartridge reel driver 210 uses the modulated velocity signal to generate a torque control signal to control the motor 212 to achieve the indicated tape velocity. In some cases, the cartridge reel driver 210 may use further parameters to generate the torque control signal. For example, the cartridge reel driver 210 may have an estimate of cartridge tape pack radius that it uses to generate the torque control signal in accordance with the modulated velocity signal.

The motor 212 rotates the cartridge reel 202 using the torque indicated by the torque control signal. Additionally, as discussed above, the motor 212 outputs a cartridge reel speed signal to the tension feedback module 207. Because of the incorporation of the tension feedback signal into the control signal, the motor 212 may operate the reel 202 to reduce AC tension at the cartridge reel frequency.

Tape drive 200 further comprises a tension feedback module 213 for the drive reel 218. The tension feedback module 213 and other drive reel components may be similar to the tension feedback module 207 and corresponding cartridge reel components. However, during operation, the radius of the tape pack around the drive reel 218 will generally be different than the radius of the tape pack around the cartridge reel 202. Accordingly, the drive reel 218 will operate at a different rotational frequency than the cartridge reel 202. Thus, AC tension caused by the drive reel 218 will generally have a different frequency than AC tension caused by the cartridge reel 202. The tension feedback module 213 generates a tension feedback signal for reducing tension variations occurring at the drive reel's 218 frequency.

The tension feedback module 213 receives the tape expansion signal from the tension sensor 206 and receives a drive reel speed signal from a drive reel motor 217. The drive reel speed signal may be obtained from a sensor coupled to the drive reel motor 217. The tension feedback module 213 uses the reel speed signal and the tape expansion signal to generate a feedback signal to reduce tape tension variation occurring at the drive reel's 218 frequency. The frequency of the tension feedback signal may track the drive reel speed, which may vary depending on read/write speed and tape pack radius. The tension feedback module 213 outputs the tension feedback signal to a combiner 214.

The combiner 214 combines the tension feedback signal with a constant tension preset signal 215 and outputs the combined signal to the drive reel driver 216. For example, the combiner 214 may sum the tension feedback signal with the constant tension preset signal 215.

The drive reel driver 216 uses the combined signal and velocity signal 211 to generate a torque control signal for the drive motor 217. In some implementations, the constant tension preset signal 215 is equal to the constant tension preset signal 208. In these implementations, the drive reel driver 216 may combine the combined signal with the velocity signal 211 in a different manner than the cartridge reel driver 210. For example, the drive reel driver 216 may sum the tension signal and the cartridge reel driver 210 may subtract the tension signal. This results in a speed difference between the drive reel 218 and cartridge reel 202 to provide tension on the tape 204. In other implementations, the preset signal 215 may have an opposite sign compared to the preset signal 208. In this case, the reel driver 216 may combine the combined signal and velocity signal 211 in the same manner as reel driver 210. For example, both drivers 216, 210 may sum the combined signal and the velocity signal 211. The drive reel driver 216 uses the final signal to generate a torque control signal for the drive reel motor 217. Like the cartridge reel driver 210, the drive reel driver 216 may take other parameters, such as drive reel pack radius into account when generating the torque control signal.

The drive reel motor 217 rotates the drive reel 218 using the torque indicated in the torque control signal. Additionally, as discussed above, the motor 217 outputs a drive reel speed signal to the tension feedback module 213. Because of the incorporation of the tension feedback signal into the control signal, the motor 217 may operate the reel 218 to reduce the tension variations that would otherwise occur at the drive reel frequency.

In some examples, the tape 104 202 can be formatted according to the Linear Tape Open (LTO) format. In other examples, other tape formats can be employed.

Figure 3:
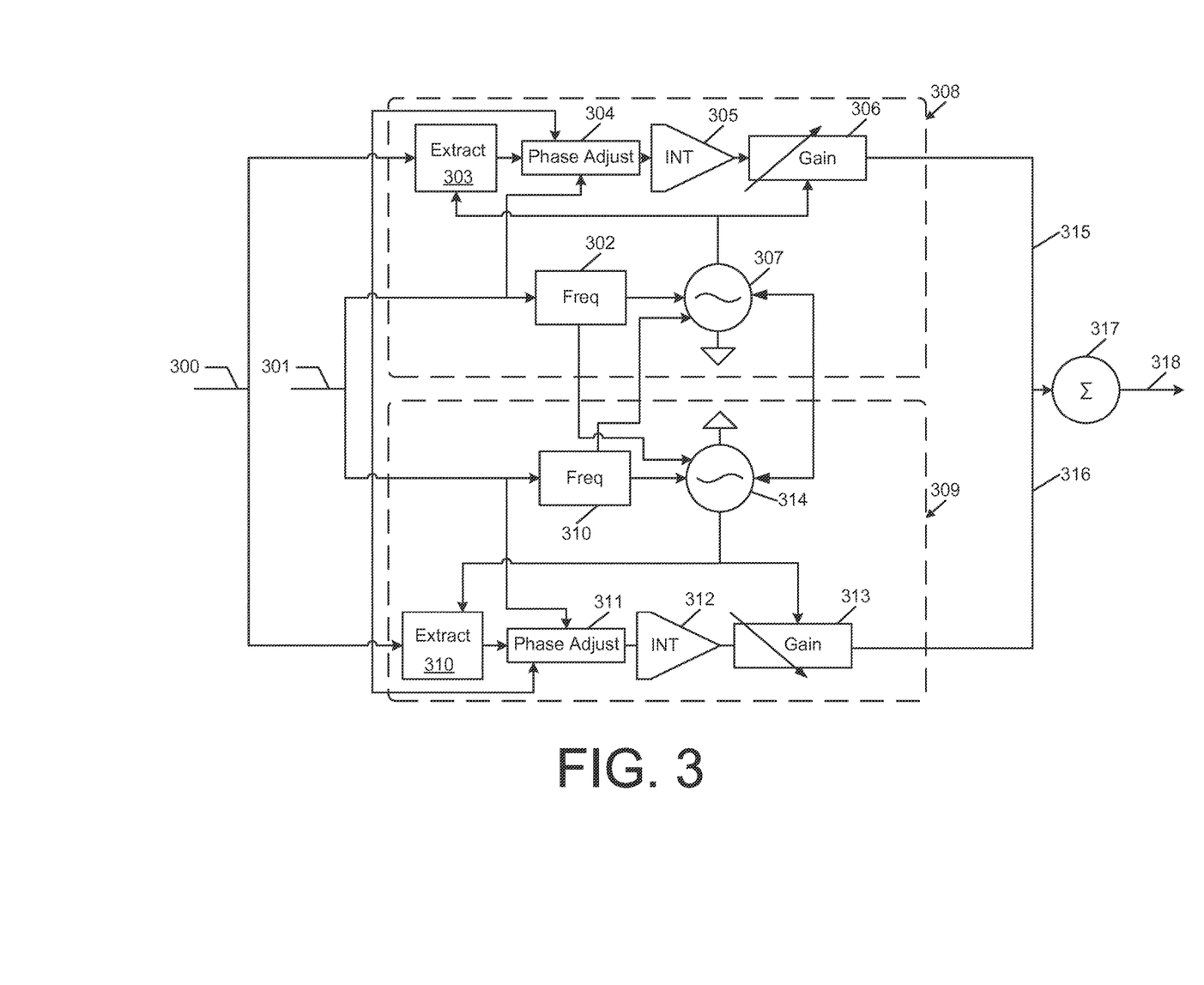
FIG. 3 illustrates an example of a tension feedback module that may be employed in the example tape drives of FIG. 1 or FIG. 2.

FIG. 3 illustrates an example tension feedback module. For example, the tension feedback module 106 of FIG. 1 or the tension feedback modules 207 and 213 of FIG. 2 might be implemented in the manner illustrated in FIG. 3. This example comprises a sine component subsystem 308 and a cosine component subsystem 309. The sine component subsystem 308 generates a sine component 315 of the tension feedbacks signal 318. The cosine component subsystem 309 generates a cosine component of the tension feedback signal 318. The tension feedback signal 318 is provided as a combination of the sine 315 and cosine 316 components.

The sine component subsystem 308 and cosine component subsystem 309 include frequency coefficient generators 302, 310, respectively. Each frequency coefficient generator 302, 310 receives reel speed information 301. For example, each frequency coefficient generator 302, 310 may receive a reel speed signal from a reel motor. Each frequency coefficient generator 302, 310 generates a frequency coefficient for a respective oscillator 307, 314.

In this example, the frequency coefficient generator 302 may output a coefficient, K sin, for a digital sine oscillator 307 as a second-order Taylor series approximation of the sine function, as follows:

$$K\sin = wk - \frac{wk^3}{6} = wk\left(1 - \frac{wk^2}{6}\right), \quad (1)$$

where $$wk = 2\pi\frac{F}{Fs},$$

where F is the reel frequency and Fs is a sampling frequency of a tape drive controller implementing the tension feedback module.

The frequency coefficient generator 310 may output a coefficient, K cos, for a digital cosine oscillator 314 as a second-order Taylor series approximation of the cosine function, as follows:

$$K\cos = 1 - \frac{wk^2}{2}. \quad (2)$$

In other examples, higher-order Taylor series approximations or other digital sine implementations may be employed.

In further examples, the frequency coefficient generators 302, 310 may apply a scale factor to wk as follows:

$$K\sin = wk * sf * \left(1 - \frac{wki^2}{6sf^2}\right) = \frac{wki}{sf} * \left(sf - \frac{wki^2}{6sf}\right), \quad (3)$$

$$K\cos = sf * \left(1 - \frac{wki^2}{2*sf^2}\right) = sf - \frac{wki^2}{2sf}, \quad (4)$$

where sf is the scale factor relating wk to wki. The scale factor, sf, may be determined for the particular implementation to adjust the behavior of the tension feedback module.

The illustrated tension feedback module includes a pair of digital oscillators 307, 314. The sine component subsystem 308 includes a sine digital oscillator 307 to output a digital sine signal. The cosine component subsystem 309 includes a cosine digital oscillator to output a digital cosine signal. The digital sine signals and digital cosine signals are oscillating signals having frequencies tracking the reel operational frequency determined from the reel speed information 301. In this example, the frequency coefficient generators 302, 310 output their respective frequency coefficients to respective digital oscillators 307, 314 to allow the oscillators 307, 314 to track the changing frequency of the tape reel.

For example, the digital sine oscillator 307 and digital cosine oscillator 314 may output a digital sine signal, N sin, and a digital cosine signal, N cos, as follows:

$$N\sin = (N\sin_p * K\cos + N\cos_p * K\sin), \quad (5)$$

$$N\cos = N\cos_p * K\cos - N\sin_p * K\sin. \quad (6)$$

where $N\sin_p$ and $N\cos_p$ are the previous values of N sin and N cos, respectively. At a first operational cycle, the digital sine oscillator 307 and digital cosine oscillator 314 may set $N\sin_p = 0$ and $N\cos_p = 1$.

In this example, every N operational cycles, the digital sine oscillator 307 and digital cosine oscillator 314 resets the digital sine and digital cosine signals, respectively, by setting $N\sin_p = 0$ and $N\cos_p = 1$. Different implementations may have different values of N. Larger values may improve the frequency accuracy but may introduce amplitude errors due to oscillator coefficient errors and truncation errors due to finite word width calculations. In one example, the oscillators 307, 314 reset every four operational cycles.

The illustrated tension feedback module includes extractors 303, 310. Each extractor 303, 310 receives the tension variation information 300 and extracts a component of the tension variation information at the frequency and phase of the oscillating signal provided by oscillator 307, 314, respectively. For example, each extractor 303, 310 may apply a Discrete Fourier Transform ("DFT") to the tension variation information 300 and provide the DFT output corresponding to the signal provided by the oscillator 307, 314, respectively.

In one example, the output, Sdft, of the sine extractor 303 and the output, Cdft, of the cosine extractor 310 are determined as follows:

$$Sdft = Ssum * \frac{Ksum}{C}, \text{ and} \quad (7)$$

$$Cdft = Csum * \frac{Ksum}{C}, \quad (8)$$

where C is a predefined constant value, Ksum is a value proportional to the input value of the tension variation information 300, and the multiplication by Ksum/C effectively divides by the number of samples in Ssum and Csum without involving a slow divide operation.

In this example, the current values of Ssum and Csum are determined from previous values of Ssum and Csum, denoted $Ssum_p$ and $Csum_p$, as follows:

$$Ssum = Ssum_p + N\sin * TE, \text{ and} \quad (9)$$

$$Csum = Csum_p + N\cos * TE, \quad (10)$$

where TE represents the current value of the tension variation information 300. In this example, the extractors 303, 310 iteratively accumulate, by summing, the respective products of TE and N sin or N cos, respectively. Like the oscillators, 307, 314, the values of Ssum and Csum may be reset after a plurality of operational cycles. For example, the values may be reset after four operational cycles.

Each extractor 303, 310 outputs the extracted component to a phase adjustor 304, 311, respectively. The phase adjustors 304, 311 adjust the phases of the extracted components to compensate for phase shifts cause by various mechanical tape drive components (i.e., "the plant").

In one example, the phase adjustors 304, 311 adjust the phases of the Sdft and Cdft signals, respectively, as follows:

$$SdftCorr = Sdft * PhCorrRe + Cdft * PhCorrIm, \text{ and} \quad (11)$$

$$CdftCorr = Cdft * PhCorrRe - Sdft * PhCorrIm, \quad (12)$$

where PhCorrRe is a real phase correction term and PhCorrIm is an imaginary phase correction term. A Taylor series may be used to approximate the real and imaginary correction terms as follows:

$$PhCorrIm = PhCorr * \left(1 - \frac{PhCorr^2}{6}\right), \text{ and} \quad (13)$$

$$PhCorrRe = 1 - \frac{PhCorr^2}{2}. \quad (14)$$

PhCorr may be determined using a linear model as follows:

$$PhCorr = PhCorrSlope * F + PhCorrIntercept, \quad (15)$$

where PhCorrSlope and PhCorrIntercept represent a linear approximation to the phase versus frequency response of the plant.

The tension feedback module further includes integrators 305, 312 that receive the respective components of the tension variation information and output gain signals. If phase adjustors 304, 311 are present, the integrators 305, 312 may receive the phase-adjusted components of the tension variation information.

In one example, the integrators 305, 312 calculate gain signals Sinj and Cinj, respectively, as follows:

$$Sinj = Sinj_p + SdftCorr * K, \text{ and} \quad (6)$$

$$Cinj = Cinj_p + (CdftCorr * K), \quad (17)$$

where $Sinj_p$ and $Cinj_p$ are the Sinj and Cinj values from the previous cycle, and K is the integrator gain. K may be set for the specific implementation to control feedback behavior.

The integrators 305, 312 provide their respective gain signals to gain adjusters 306, 313. Each gain adjuster 306, 313, receives an oscillating signal from a respective oscillator 307, 314. Each gain adjuster 306, 313 adjusts the gain of the received oscillating signal using its respective gain signal. The outputs 315, 316 of the gain adjusters 306, 313 are combined by combiner 317 and output as the tension feedback signal 318.

In one example, the gain adjusters 306, 313, adjust the amplitude of N sin and N cos, respectively, as follows:

$$NsinInj = Sinj * \frac{Nsin}{sf}, \text{ and} \quad (18)$$

$$NcosInj = Cinj * \frac{Ncos}{sf}. \quad (19)$$

Figure 4:
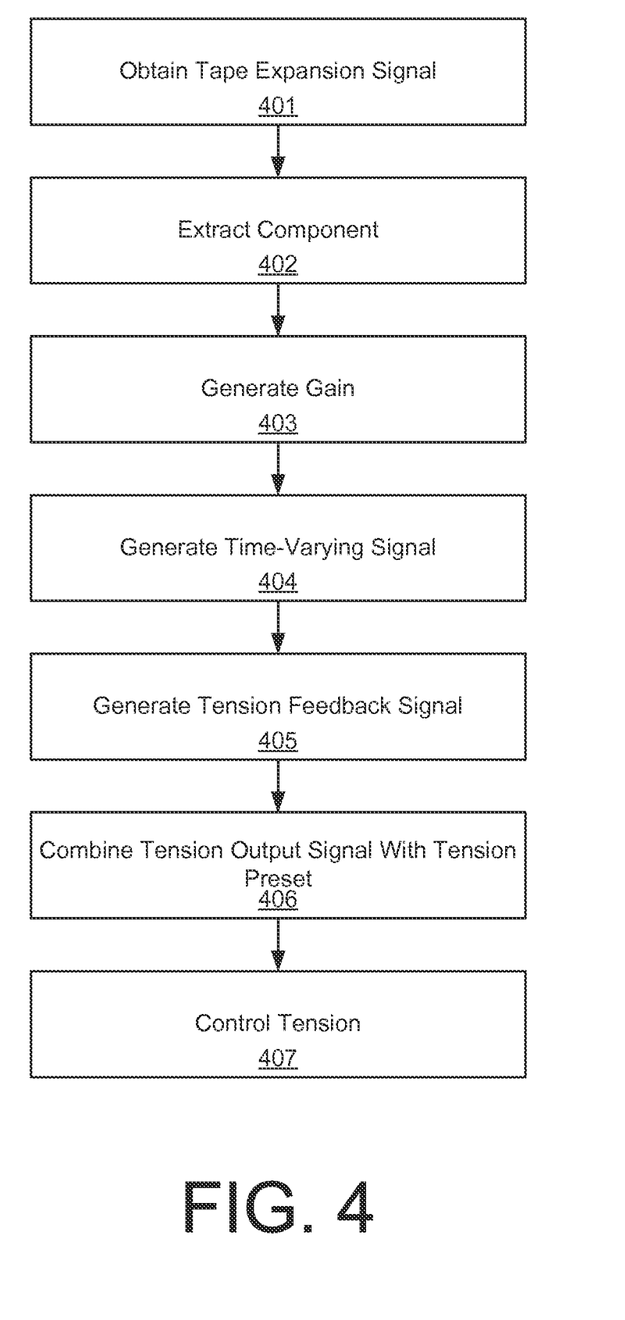
FIG. 4 illustrates an example method of controlling tension applied to a tape.

FIG. 4 illustrates an example flow diagram of a method of tape tension control. For example, this method may be performed by a tape drive controller implementing various modules illustrated in FIG. 1 or FIG. 2. For example, with respect to FIG. 1, the method may be performed by a tape drive controller implementing the tension sensor 105, the tension feedback module 106, the combiner 107, and the driver 109. As a further example, this method may be performed by a tape drive controller implementing a tension feedback module as illustrated FIG. 3.

The illustrated process includes obtaining a tape expansion signal 401. The process further includes extracting a component of the tape expansion signal at a reel frequency 402. For example, extracting the component 401 may include generating a Discrete Fourier Transform (DFT) output of the tape expansion signal.

The DFT output may be determined using a time-varying signal, such as a digital sine or cosine signal, as an input. The time-varying signal may have a frequency equal to the reel frequency, such that the component of the tape expansion signal has a frequency equal to the reel frequency. In some implementations, the reel frequency may be tracked by using a previous value of the time-varying signal for a plurality of operational cycles, and resetting after the plurality of operational cycles.

In some implementations, the step of extracting 402 includes extracting a second component of the tape expansion signal at the reel frequency. For example, the step of extracting 402 may comprise extracting a reel frequency sine component of the tape expansion signal and a reel frequency component of the tape expansion signal. Both components may be DFT outputs determined using respective time-varying signals. For example, the sine component may be extracted using a digital sine signal and the cosine component may be extracted using a digital cosine signal.

The process further includes generating a gain signal using the extracted component 403. For example, the gain signal may be determined using an integrator.

If a second component of the tape expansion signal is extracted in step 402, then step 403 may include generating a second gain signal using the extracted second component. For example, the second gain signal may also be determined using an integrator.

In some implementations, the step of generating the gain signal 403 may include adjusting a phase of the extracted component of the tape expansion signal or adjusting a phase of the gain signal. For example, the phase of the extracted component or gain signal may be adjusted to compensate for phase shift caused by the tape drive plant.

The process further includes generating a time-varying signal having a frequency equal to the reel frequency 404. For example, the step of generating the time-varying signal 404 may comprise generating a digital cosine signal or a digital sine signal.

If a second component of the tape expansion signal is extracted in step 402, step 404 may comprise generating a second time-varying signal having a frequency equal to the reel frequency 404. For example, step 404 may comprise generating a digital cosine signal and a digital sine signal. In some implementations, the time-varying signal or signals generated in step 404 may be used to extract the component or components in step 402.

The process further includes generating a tension feedback signal by adjusting an amplitude of the time-varying signal using the gain signal 405.

If a second component of the tape expansion signal is extracted in step 402, step 405 may comprise adjusting an amplitude of the second time-varying signal using the second gain signal. In these implementations, step 405 may further comprise combining the amplitude-adjusted time varying signals. For example, an amplitude-adjusted sine component may be combined with an amplitude-adjusted cosine component to generate a tension feedback signal having an amplitude, phase, and frequency for reducing AC tension variation at the reel frequency.

The process further includes generating a combined tension signal by combining the tension feedback signal with a constant tension preset signal 406. For example, the constant tension preset signal may set a DC tension on the tape while the tension feedback signal reduces a component of AC tension variation on the tape.

The process further includes controlling tension applied to a tape using the combined tension signal 407. For example, the combined tension signal 407 may be used to modulate a reel speed control signal to control the tension on the tape.

Figure 5:
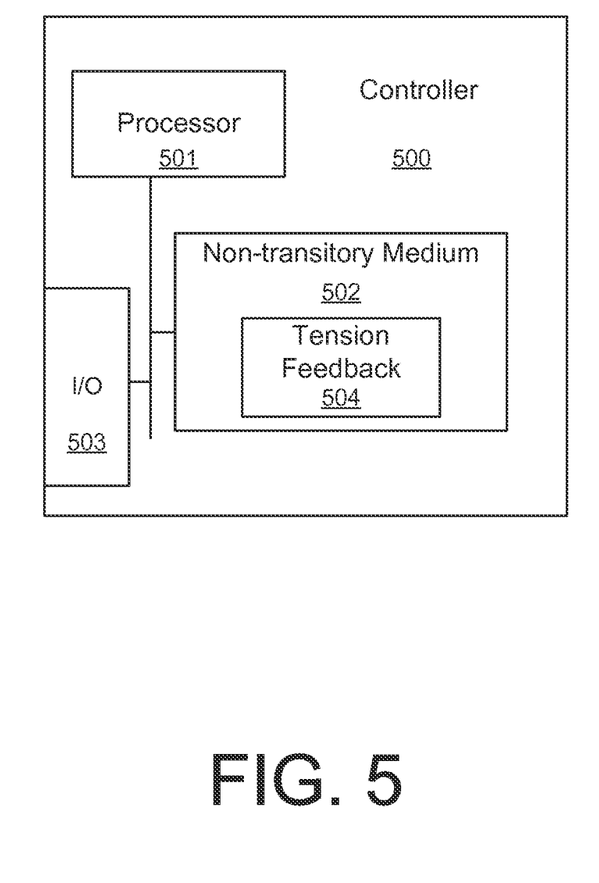
FIG. 5 illustrates a tape drive controller with a non-transitory computer readable medium having instructions executable by a processor to generate a tension feedback signal for tension control.

FIG. 5 illustrates a tape drive controller 500 implementing a tension feedback module. For example, the tape drive controller 500 may implement the tension feedback module 106 of FIG. 1, the tension feedback modules 207 and 213 of FIG. 2, or the tension feedback module of FIG. 3.

The controller 500 includes a non-transitory computer readable medium having computer executable instructions stored thereon. The non-transitory computer readable medium 500 may comprise controller firmware, such as read-only memory. For example, the medium 500 may comprise erasable and programmable read-only memory (EPROM), electrically erasable and programmable read-only memories (EEPROMs), flash memories, or other types of non-transitory memory or storage.

In the illustrated example, the instructions stored on medium 502 are executable by a processor 501 to implement a tension feedback module 504. Implementation of the tension feedback module 504 may cause the processor to perform various steps. Implementing the module 504, the processor 501 to obtain tension variation information. For example, the processor 501 may obtain the tension variation information using I/O 503. As another example, the processor 501 may implement a tension sensor, such as tension sensor 105 of FIG. 1, in firmware. In this example, the processor 501 may obtain servo information using I/O 503, and may determine the tension variation information from the servo information.

Implementing the module 504, the processor generates a tension feedback signal to reduce tension variation occurring at a reel frequency. In some examples, generating the tension feedback signal may comprise generating a sine component and a cosine component of the tension feedback signal. The sine component and the cosine component may be combined to generate the tension feedback signal.

Implementing the module 504, the processor combines the tension feedback signal with a constant tension preset signal. Implementing the module 504, the processor 501 causes the controller 500 to provide the combined signal to a tape reel driver using I/O 503.

In a further example, implementing the module 504 further causes the processor to generate a second tension feedback signal to reduce tension variation occurring at a second reel frequency. For example, the processor may generate the first tension feedback signal for a tape cartridge reel and may generate the second tension feedback signal for a tape drive reel. In this example, the processor combines the second tension feedback signal with a second constant tension preset signal and provides the second combined signal to a second tape reel driver.

In another example, the tape reel driver is another module stored on medium 502 and implemented in the controller 500. In this example, the final tape driving signal is provided to a reel motor using I/O 503.

In the foregoing description, numerous details are set forth to provide an understanding of the subject disclosed herein. However, implementations may be practiced without some or all of these details. Other implementations may include modifications and variations from the details discussed above. The appended claims cover such modifications and variations.

The invention claimed is:

1. A tape drive, comprising:
   a tension sensor to obtain tension variation information;
   a tension feedback module to generate a tension feedback signal to reduce tension variation occurring at a reel frequency, wherein the tension feedback module is to generate a sine component and a cosine component, and combine the sine component and cosine component to generate the tension feedback signal;
   a combiner to combine a constant tension preset signal and the tension feedback signal to generate a combined signal; and
   a driver to drive a tape reel at a reel speed adjusted according to the combined signal.

2. The tape drive of claim 1, further comprising:
   a second tension feedback module to generate a second tension feedback signal to reduce tension variation occurring at a second reel frequency; and
   a second combiner to combine a second constant tension preset and the second tension feedback signal to generate a second combined signal; and
   a second driver to drive a second tape reel at a second reel speed adjusted according to the second combined signal.

3. The tape drive of claim 1, wherein the reel speed controller is a tape cartridge reel speed controller.

4. The tape drive of claim 1, wherein the tension feedback module comprises:
   a sine feedback module subsystem to generate the sine component of the tension feedback signal;
   a cosine feedback module subsystem to generate the cosine component of the tension feedback signal; and
   a second combiner to combine the sine component and the cosine component to generate the tension feedback signal.

5. The tape drive of claim 1, wherein the tension feedback module comprises:
   a frequency coefficient generator to receive reel speed information;
   an oscillator to generate an oscillating signal having a frequency tracking the reel frequency;
   an extractor to receive the tension variation information and the oscillating signal and to extract a component of the tension variation information at the frequency of the oscillating signal;
   an integrator to receive the component of the tension variation information and to output a gain signal; and
   a gain adjuster to adjust the gain of the oscillating signal using the gain signal and to output the adjusted oscillating signal as the tension feedback signal.

6. The tape drive of claim 5, wherein the tension feedback module further comprises:
   a phase adjuster to receive the component of the tension variation information from the filter, adjust a phase of the component of the tension variation information, and provide the phase-adjusted component of the tension variation information to the integrator.

7. The tape drive of claim 5, wherein the oscillator is to track the reel frequency by using a previous oscillator output for a plurality of operational cycles and reset the reel frequency after the plurality of operational cycles.

8. A method, comprising:
   obtaining a tape expansion signal;
   extracting a component of the tape expansion signal at a reel frequency;
   generating a gain signal using the extracted component;
   generating a time-varying signal having a frequency equal to the reel frequency;
   generating a tension feedback signal by adjusting an amplitude of the time-varying signal using the gain signal;

generating a combined tension signal by combining the tension feedback signal with a constant tension preset signal; and controlling tension applied to a tape using the combined tension signal.

9. The method of claim 8, further comprising:

extracting a second component of the tape expansion signal at the reel frequency;

generating a second gain signal using the extracted second component;

generating a second time-varying signal having a second frequency equal to the reel frequency; and adjusting a second amplitude of the second time-varying tension signal using the second gain value;

wherein the step of generating the tension feedback signal further comprises combining the first amplitude-adjusted time-varying tension signal with the second amplitude-adjusted time-varying tension signal.

10. The method of claim 8, further comprising:

prior to the step of generating the tension feedback signal, adjusting a phase of the extracted component of the tape expansion signal or adjusting a phase of the gain signal.

11. The method of claim 8, wherein the step of extracting the component of the tape expansion signal at the reel frequency comprises generating a Discrete Fourier Transform output of the tape expansion signal using the time-varying tension signal.

12. The method of claim 8, further comprising:

tracking the reel frequency by using a previous value of the time-varying signal for a plurality of operational cycles; and resetting the reel frequency after the plurality of operational cycles.

13. A non-transitory computer readable medium having computer executable instructions stored thereon, the instructions being executable by a processor to:

obtain tension variation information;

generate a tension feedback signal to reduce tension variation occurring at a reel frequency, wherein, to generate the tension feedback signal, the instructions are executable by the processor to generate a sine component and a cosine component, and combine the sine component and cosine component;

combine the tension feedback signal with a constant tension preset signal; and provide the combined signal to a tape reel driver.

14. The non-transitory computer readable medium of claim 13, wherein the instructions are executable by the processor to:

generate a second tension feedback signal to reduce tension variation occurring at a second reel frequency;

combine the second tension feedback signal with a second constant tension preset signal; and provide the second combined signal to a second tape reel driver.

15. The non-transitory computer readable medium of claim 13, wherein, to generate the tension feedback signal, the instructions are executable by the processor to:

receive reel speed information;

generate an oscillating signal having a frequency tracking the reel frequency;

extract a component of the tension variation information at the frequency of the oscillating signal;

output a gain signal based on the component of the tension variation information; and adjust a gain of the oscillating signal using the gain signal and output the adjusted oscillating signal as the tension feedback signal.

16. The non-transitory computer readable medium of claim 15, wherein the instructions are executable by the processor to:

adjust a phase of the component of the tension variation information; and output the gain signal based on the phase-adjusted component of the tension variation information.

17. The non-transitory computer readable medium of claim 15, wherein the instructions are executable by the processor to:

track the reel frequency based on a previous oscillator output for a plurality of operational cycles; and reset the reel frequency after the plurality of operational cycles.

* * * * *